(12) United States Patent
Buschjohann et al.

(10) Patent No.: US 10,000,238 B2
(45) Date of Patent: Jun. 19, 2018

(54) MODULAR SYSTEM

(71) Applicant: KSM CASTINGS GROUP GMBH, Hildesheim (DE)

(72) Inventors: Thomas Buschjohann, Nordstemmen (DE); Heik Lachmund, Holle (DE); Thilo Roeth, Aachen (DE); Daniel Kern, Aachen (DE)

(73) Assignee: KSM Castings Group GmbH, Hildesheim (DE)

( * ) Notice: Subject to any disclaimer, the term of this patent is extended or adjusted under 35 U.S.C. 154(b) by 0 days. days.

(21) Appl. No.: 14/437,880

(22) PCT Filed: Oct. 24, 2013

(86) PCT No.: PCT/DE2013/100367
§ 371 (c)(1),
(2) Date: Apr. 23, 2015

(87) PCT Pub. No.: WO2014/063687
PCT Pub. Date: May 1, 2014

(65) Prior Publication Data
US 2015/0298739 A1 Oct. 22, 2015

(30) Foreign Application Priority Data
Oct. 24, 2012 (DE) .................. 10 2012 110 176

(51) Int. Cl.
*B62D 21/08* (2006.01)
*B62D 21/02* (2006.01)
*B62D 29/00* (2006.01)
*B62D 25/20* (2006.01)

(52) U.S. Cl.
CPC ............. *B62D 21/08* (2013.01); *B62D 21/02* (2013.01); *B62D 25/2027* (2013.01); *B62D 29/008* (2013.01)

(58) Field of Classification Search
CPC .... B62D 21/02; B62D 21/08; B62D 25/2027; B62D 29/008; B62D 21/11; B62D 21/12
See application file for complete search history.

(56) References Cited

U.S. PATENT DOCUMENTS

| 4,618,163 | A |  | 10/1986 | Hasler et al. | |
|---|---|---|---|---|---|
| 4,988,230 | A | * | 1/1991 | Banthia | A47B 47/0008 403/170 |
| 5,085,485 | A | * | 2/1992 | Wurl | B62D 29/008 293/155 |

(Continued)

FOREIGN PATENT DOCUMENTS

| DE | 10226526 A1 * | 8/2003 | ........... B23K 20/122 |
|---|---|---|---|
| DE | 603 01 568 T2 | 6/2006 | |

(Continued)

OTHER PUBLICATIONS

International Search Report of PCT/DE2013/100367, dated Apr. 24, 2014.

*Primary Examiner* — Laura Freedman
(74) *Attorney, Agent, or Firm* — Collard & Roe, P.C.

(57) ABSTRACT

A modular system in the form of a load-bearing frame to be arranged in a tail region of a motor vehicle. The modular components which are to be linked or are linked include at least one cast structure and at least two profiles, the cast structure comprising at least one node.

8 Claims, 6 Drawing Sheets

(56) References Cited

U.S. PATENT DOCUMENTS

| | | | | |
|---|---|---|---|---|
| 5,112,102 A * | 5/1992 | Wurl | B62D 23/00 | 280/785 |
| 5,226,696 A * | 7/1993 | Klages | B62D 23/005 | 296/203.01 |
| 5,316,367 A * | 5/1994 | Enning | B62D 29/008 | 296/187.09 |
| 5,332,277 A * | 7/1994 | Enning | B62D 29/008 | 296/192 |
| 5,393,095 A * | 2/1995 | Kreis | B62D 21/152 | 280/781 |
| 5,496,067 A * | 3/1996 | Stoll | B62D 21/07 | 280/781 |
| 5,716,155 A * | 2/1998 | Yoshida | B62D 23/005 | 403/187 |
| 5,741,026 A * | 4/1998 | Bonnville | B62D 29/008 | 280/288 |
| 5,915,727 A * | 6/1999 | Bonnville | B60G 7/02 | 280/124.1 |
| 6,193,273 B1 * | 2/2001 | Novak | B62D 21/00 | 280/781 |
| 6,203,099 B1 * | 3/2001 | Iwatsuki | B62D 21/10 | 296/204 |
| 6,328,377 B1 * | 12/2001 | Makita | B62D 21/152 | 296/203.02 |
| 6,402,414 B1 * | 6/2002 | Kanodia | B62D 23/005 | 296/205 |
| 6,648,351 B1 * | 11/2003 | Kosak | B62D 21/09 | 280/124.109 |
| 7,322,106 B2 * | 1/2008 | Marando | B22D 19/045 | 29/507 |
| 7,805,840 B2 | 10/2010 | Bingham et al. | | |
| 7,938,414 B2 * | 5/2011 | Buschjohann | B60G 3/202 | 280/124.109 |
| 8,286,319 B2 * | 10/2012 | Stolle | B21D 26/035 | 285/382.5 |
| 8,684,382 B2 * | 4/2014 | Buschjohann | B62D 21/11 | 180/311 |
| 2011/0081197 A1 * | 4/2011 | Buschjohann | B62D 23/005 | 403/345 |
| 2013/0009390 A1 * | 1/2013 | Charest | B22D 19/00 | 280/785 |
| 2013/0320715 A1 * | 12/2013 | Greven | C22C 21/02 | 296/204 |
| 2014/0117654 A1 * | 5/2014 | Buschjohann | B62D 21/11 | 280/795 |
| 2015/0020388 A1 * | 1/2015 | Moss | B62D 27/00 | 29/897.2 |
| 2015/0114735 A1 * | 4/2015 | Buschjohann | B60K 1/04 | 180/68.5 |

FOREIGN PATENT DOCUMENTS

| | | |
|---|---|---|
| DE | 10 2007 006 722 A1 | 12/2008 |
| EP | 0 146 716 A2 | 7/1985 |
| EP | 0 900 716 A1 | 3/1999 |
| EP | 1 840 010 A1 | 10/2007 |
| JP | 09301216 A * | 11/1997 |
| JP | 2005289126 A * | 10/2005 |

* cited by examiner

MODULAR SYSTEM

CROSS REFERENCE TO RELATED APPLICATIONS

This application is the National Stage of PCT/DE2013/100367 filed on Oct. 24, 2013, which claims priority under 35 U.S.C. § 119 of German Application No. 10 2012 110 176.0 filed on Oct. 24, 2012, the disclosure of which is incorporated by reference. The international application under PCT article 21(2) was not published in English.

BACKGROUND OF THE INVENTION

1. Field of the Invention

The invention relates to a modular system as a load-bearing frame to be disposed in the rear region of a motor vehicle.

2. Description of the Related Art

It is known that in the automotive industry, frames are used as a load-bearing lower framework for the motor vehicle superstructure. Such frames essentially form the main framework of the motor vehicle. Usually, the wheel suspension and the assemblies of the motor vehicle are attached to this frame. Known frames consist of two side members that are welded, riveted or screwed onto cross members and diagonal struts.

A distinction is made, in accordance with the shape of the frame, among ladder frames, X frames, platform frames, and lattice frames. In a ladder frame, the two side members are connected with one another by means of multiple cross members. Such a frame is predominantly used in trucks and SUVs. In what is called an X frame, two side members made of round or oval tubes approach one another in the center, to as little as a few centimeters, and appear as an X in a top view. In a platform frame, the car body floor is an integral part of the frame and is generally welded to the frame. This form of a frame is characterized by particularly great torsional rigidity and a low center of gravity. In a lattice frame, the frame parts are welded to one another in such a manner that they can form the base for the superstructure. A lattice frame is extremely torsion-resistant and is used in buses, sports cars, and racing cars.

In passenger cars, but also in buses, the self-supporting method of construction predominates today, in which instead of the frame, a floor group holds not only the load-bearing parts but also the trunk floor and the wheel boxes.

It is a disadvantage in some of the aforementioned frames or the floor group that they comprise a plurality of individual parts in the rear region of a motor vehicle, which must be joined together on site, in complicated, time-consuming and therefore cost-intensive manner. Not rarely, such frames or floor groups comprise more than 20 different individual parts, without including the required joining means in this number. It is a further disadvantage that some of the aforementioned frames and the said floor groups are configured in such a manner that they can be connected with chassis components, particularly with wheel suspensions such as steering arms, stabilizers, springs and/or dampers, only by way of a subframe, which is also referred to as an assembly support, axle support or auxiliary frame. Furthermore, the said frames or floor groups also have a relatively high weight, which has a negative effect on the fuel consumption of a motor vehicle. Furthermore, the said frames or floor groups, which have many connection points or joining locations, are more susceptible to production defects and can also have reduced mechanical properties with regard to a desired deformation behavior or a desired rigidity. The more connection points or joining locations there are, the greater the aforementioned deficits are.

Frames or floor groups as mentioned above are known to be complicated in their development and are generally tailored to a single vehicle type or a single vehicle series. A disadvantage of this is that individual parts that already exist often can no longer be used for a new vehicle type or a new vehicle series, and, in particular, the machines specifically procured and generally newly developed for their production can no longer be used, and therefore have to be newly procured or, if necessary, newly developed.

SUMMARY OF THE INVENTION

The present invention is therefore based on the task of overcoming the previous disadvantages and restrictions and of making available a possibility for improving a frame or a floor group of the type mentioned initially, with regard to assembly, weight, production and development costs, safety-relevant aspects, particularly deformation behavior and torsional rigidity, and for replacing it, at least in parts.

This task is accomplished by means of a modular system as described herein. Further developments and advantageous embodiments are also described herein.

According to the invention, a modular system as a load-bearing frame to be disposed in the rear region of a motor vehicle is provided, which frame has components that are to be connected or are connected with one another in modular manner, wherein the components are at least one cast structure and at least two profiles, and the cast structure comprises at least one node.

Such a system has the advantage that a corresponding load-bearing frame to be disposed in the rear region of a motor vehicle can be produced in very simple manner, from only a few components, and does not have to be joined together, usually on site, from many individual parts, in complicated, time-consuming and thereby cost-intensive manner. It can be advantageous if the cast structure is cast in one piece. The profiles can be connected very easily, by way of the at least one cast structure having at least one node. In this connection, the node is the connection location in the load-bearing frame. The profiles are connected with one another there.

The profiles can be advantageously connected, at least in part, by means of gluing, welding, particularly by means of resistance spot welding, by means of crimping of predetermined regions of the axle body, by means of clinching, by means of punch riveting and/or by means of screwing them onto the cast structure or the node or nodes.

Furthermore, the same modular system can advantageously be used as a load-bearing frame disposed in the rear region of the motor vehicle, in comprehensive manner for different vehicle types, with only slight changes. For example, it is sufficient to exchange individual profiles, particularly longitudinal profiles, in order to use the otherwise similar modular system for vehicles having different total lengths.

Consequently, the modular system according to the invention allows needing to newly develop only those components of the load-bearing frame to be disposed in the rear region of a motor vehicle of a new vehicle type that are required for an adaptation of the existing modular system. For the remaining components, such as cast nodes or smaller cast structures, for example, the components already in existence can be used. Accordingly, the modular system according to the invention allows the development costs for the load-bearing frame to be disposed in the rear region of the motor vehicle to be reduced for a new vehicle type or model.

The use of a reduced number of components has the result that fewer joining operations are also required for assembly of the load-bearing frame to be disposed in the rear region of the motor vehicle. Therefore fewer safety-relevant connection locations between the components are also present, thereby improving the deformation behavior of a load-bearing frame composed of a modular system according to the invention, to be disposed in the rear region of a motor vehicle. The use of a modular system according to the invention increases the torsional rigidity or the rigidity in a rear crash load case by up to 4 percent or by up to 5 percent, respectively.

Furthermore, the modular system according to the invention possesses a great weight-saving potential because of the structure of the individual components. In particular, configuration of the components as cast components or as extruded profiles, particularly of a material that comprises a light material, particularly light metal, allows producing the individual components to be relatively light. The weight-saving potential is as much as 37 percent in comparison with the state of the art.

It can be advantageous if the cast structure and/or the profiles are produced, at least in part, from a light material, preferably from light metal, from plastic or a composite of light metal and plastic.

Depending on the preferred advantage, the modular system according to the invention can be adapted accordingly. The lower the number of components, the lower the production and development costs. Furthermore, in such an embodiment, the time saving during production of the load-bearing frame to be disposed in the rear region of a motor vehicle is the greatest. However, such a modular system could be used for different vehicle types with greater difficulty. In contrast to this, the scaling potential, the variability and the integrability increase with an increasing number of components. A modular system having a plurality of components can be adapted to the requirements of a new vehicle type in simple manner, by means of changing individual components.

Furthermore, the modular system according to the invention offers the possibility of integrating further components into a load-bearing frame to be disposed in the rear region of a motor vehicle. For example, components of the chassis can already be integrated into the components of the modular system of the frame. In this connection, integration can take place in the profiles and/or in the cast structures. As a result, it is possible to do without conventional auxiliary frames entirely. The components of the chassis can be components that are rigidly connected with the load-bearing frame according to the invention, to be disposed in the rear region of a motor vehicle, or components that are movably connected with the frame. In the latter case, the profiles and/or preferably the cast structures have individual seats for connecting, mounting or attaching chassis components, particularly seats for connecting wheel suspensions, such as steering arms, stabilizers, springs and/or dampers, or for connecting assemblies.

Accordingly, it is possible to classify the modular system in three embodiments, for example, as a function of the integration of components of a chassis.

In its simplest embodiment, the modular system, also referred to as a modular cast construction kit (MGM)-CLASSIC, could have no integration of chassis components.

In an embodiment that is developed further, the modular system, also referred to as a modular cast construction kit (MGM)-LIGHT, could have partial integration of chassis components.

In its most developed embodiment that is developed further, the modular system, also referred to as a modular cast construction kit (MGM)-MAX, could have complete integration of chassis components.

It can be advantageous if each cast structure comprises precisely one node. It can be practical if the node is configured as a cast node.

If each node is formed by an individual cast structure in the form of a cast node, the variability of the modular system is increased, and it is possible to use the components of a single modular system for load-bearing frames to be disposed in the rear region of a motor vehicle for different vehicle types. Therefore it is possible to use identical components for the production of a load-bearing frame to be disposed in the rear region of a motor vehicle for different vehicle types, which reduces the production costs of the individual component of the modular system.

A possible further development of the invention provides that at least two nodes are combined in a cast structure.

Furthermore, an advantage can result if the cast structure comprises all the nodes of the frame.

Combining nodes reduces the number of components that are required for assembling a load-bearing frame to be disposed in the rear region of a motor vehicle. As a result, the time expenditure for assembly is reduced and the production costs are lowered.

It can prove to be advantageous if at least one profile is disposed between two cast components.

Furthermore, it can be practical if the profile is configured as an extruded profile.

It can be advantageous if at least one side member and/or cross member of the frame is configured as a profile, preferably as an extruded profile.

It can be advantageous if at least one cast structure and/or at least one profile comprises at least one component of a chassis. The components of the chassis can be those that are rigidly connected with the load-bearing frame to be disposed in the rear region of a motor vehicle, according to the invention, or integrated into the frame, or those that are movably connected with the frame. In the latter case, the profiles and/or preferably the cast structures have individual seats for connecting, mounting or attaching chassis components, particularly seats for connecting wheel suspensions, such as steering arms, stabilizers, springs and/or dampers, or assemblies.

By means of the partial integration of chassis components, particularly of corresponding seats for such chassis components, such as those for the wheel suspension, into the cast structure, the scope of the components for a frame with chassis can be even further reduced. Consequently, the time for design and assembly of the chassis can also be reduced.

It can be advantageous if the cast structure and/or the profile has all, particularly all the rigidly connected components, or advantageously the predominant part of all the components of a chassis. The components of the chassis can be those that are rigidly connected with or integrated into the load-bearing frame to be disposed in the rear region of a motor vehicle, according to the invention, or those that are movable connected with the frame. In the latter case, the profiles and/or preferably the cast structures have individual seats for connecting, mounting or attaching chassis components, particularly seats for connecting wheel suspensions, such as steering arms, stabilizers, springs and/or dampers, or for assemblies.

In the case of complete or predominant integration of a chassis into the components of the modular system, no additional time is required in the design and assembly of the chassis, because the required individual parts are already integrated into the components of the frame, and are brought to the intended or correct location as a result of the design and assembly of the frame.

It can prove to be practical if at least one profile is a cast profile, particularly an extruded profile.

Furthermore, it can be advantageous if at least one cast structure consists of a light material, particularly a light metal. The light metal can consist of aluminum, magnesium, zinc or also of alloys having one or more of these metals.

For certain purposes of use, one or more parts of the cast structure can also consist of steel or iron, particularly of cast steel or cast iron.

It can be advantageous if at least one profile consists of a light material, particularly a light metal. The light metal can consist of aluminum, magnesium, zinc or of alloys having one or more of these metals.

For certain purposes of use, one of more profiles can also consist of steel or iron, particularly of cast steel or cast iron.

For some cases of use, a plastic can be advantageous as the light material. For yet other cases of use, a composite of light metal and plastic can be advantageous. It can be advantageous if the plastic is a polyamide, particularly a glass-fiber-reinforced polyamide. However, a plastic composed of polypropylene, particularly glass-fiber-reinforced polypropylene, can also advantageously be used.

The use of light metal, particularly of aluminum or an aluminum alloy, in the configuration of the cast structures and/or of the cast profiles brings with it the advantage that the individual cast components have a significantly lower weight than those made of steel, for example.

BRIEF DESCRIPTION OF THE DRAWINGS

Further developments and advantageous embodiments of the invention can also result from the following description of exemplary embodiments that are shown in the drawing. This shows.

DETAILED DESCRIPTION OF THE PREFERRED EMBODIMENTS

Figure 1:
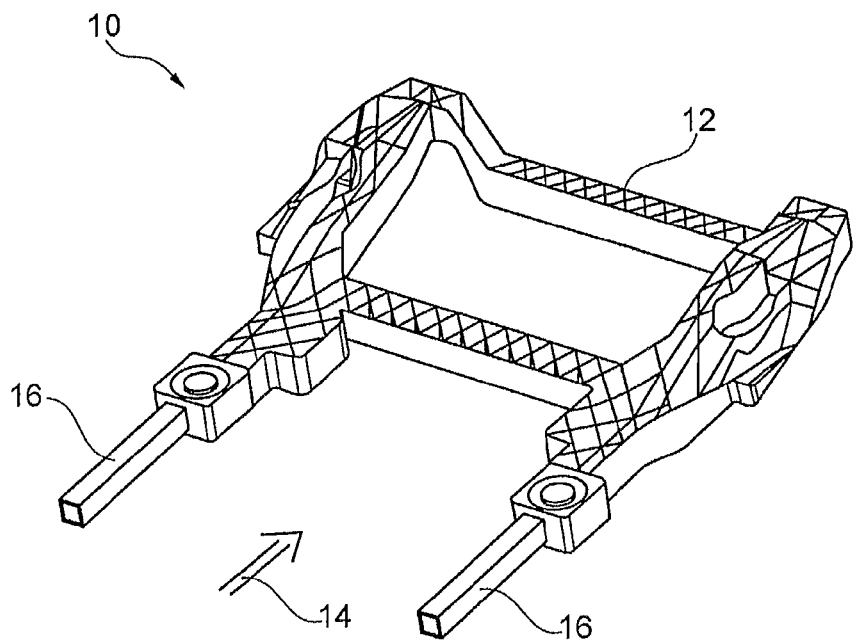
FIG. 1 a modular system comprising a large cast structure that contains all the nodes and cross members, FIG. 2 a modular system comprising two large cast structures that contain all the nodes, and cross members that are configured as profiles, particularly as extruded profiles, FIG. 3 a modular system comprising smaller cast structures, each having at least one node, profiles disposed between the nodes, and cross members that are configured as profiles, particularly as extruded profiles, FIG. 4 an exploded drawing of the system shown in FIG. 3, FIG. 5 a modular system comprising smaller cast structures, each having at least one node, profiles disposed between the nodes, and cross members that are configured as profiles, particularly as extruded profiles, FIG. 6 a modular system comprising smaller cast structures, each having at least one node, profiles disposed between the nodes, and cross members that are configured as profiles, particularly as extruded profiles, FIG. 7 a modular system comprising smaller cast structures, each having at least one node, profiles disposed between the nodes, and cross members that are configured as profiles, particularly as extruded profiles, FIG. 8 a modular system comprising cast structures, each having precisely one node, profiles disposed between the nodes, and cross members that are configured as profiles, particularly as extruded profiles, FIG. 9 a modular system comprising cast structures, each having precisely one node, profiles disposed between the nodes, and cross members that are configured as profiles, particularly as extruded profiles, FIG. 10 an exploded drawing of a modular system, with partial integration of a chassis, comprising smaller cast structures, each having at least one node, profiles disposed between the nodes, and cross members that are configured as profiles, particularly as extruded profiles, FIG. 11 an exploded drawing of a modular system, with complete integration of a chassis, comprising two large cast structures that contain all the nodes, and cross members that are configured as profiles, particularly as extruded profiles.

FIG. 1 shows a load-bearing frame to be disposed in a rear region of a motor vehicle, built up of components of a modular system 10 according to the invention. In the exemplary embodiment shown, the major portion of the frame is formed by a single cast structure 12, which comprises all the nodes and cross members. On the rear side of the cast structure 12, seen in the direction of travel 14, a profile 16, particularly an extruded profile in the form of a side member, is disposed on each side of the cast structure 12.

Figure 2:
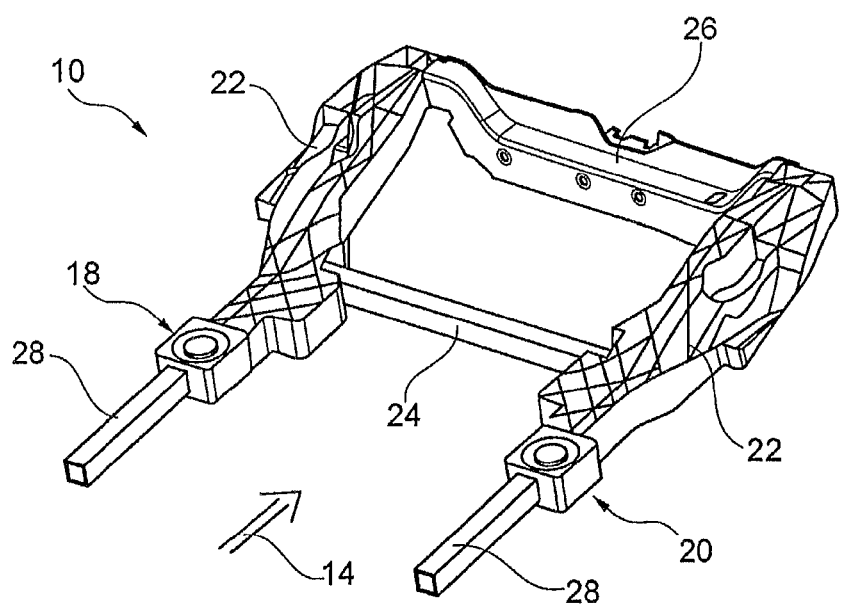

FIG. 2 shows a load-bearing frame to be disposed in the rear region of a motor vehicle, built up from components of a modular system 10 according to the invention. In the exemplary embodiment shown, the left side 18 and right side 20 of the frame, viewed in the direction of travel 14, are formed, for the most part, from a cast structure 22, in each instance, wherein the respective cast structure 22 comprises all the nodes of its frame side 18, 20. The cast structures 22, disposed on the left side 18 and right side 20, viewed in the direction of travel 14, are connected by way of a first 24 and a second 26 cross member, viewed in the direction of travel 14. The cross members 24, 26 are configured as profiles, particularly as extruded profiles. On the rear side of each cast structure 22, viewed in the direction of travel 14, a profile 28, particularly an extruded profile in the form of a side member, is disposed.

Figure 3:
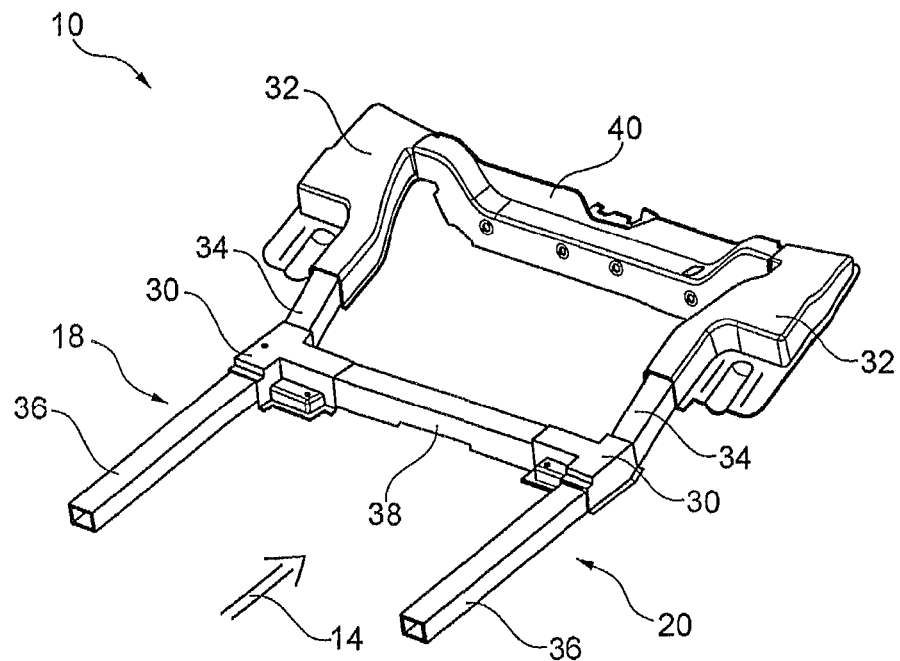

FIG. 3 shows a load-bearing frame to be disposed in the rear region of a motor vehicle, built up from components of a modular system 10 according to the invention. In the exemplary embodiment shown, the left side 18 and right side 20 of the frame, viewed in the direction of travel 14, are each formed from two cast structures 30, 32 and two profiles 34, 36, particularly extruded profiles in the form of side members. In this connection, a profile 34, particularly an extruded profile, is disposed between a first 30 and a second 32 cast structure of each frame side 18, 20, viewed in the direction of travel 14. Each cast structure 30, 32 comprises at least one node. The first cast structure 30 of the left 18 and the right 20 frame side, viewed in the direction of travel 14, are connected with one another by means of a first cross member 38, viewed in the direction of travel 14. The second cast structure 32 of the left 18 and the right 20 frame side, viewed in the direction of travel 14, are connected with one another by means of a second cross member 40, viewed in the direction of travel 14. The cross members 38, 40 are configured as profiles, particularly as extruded profiles. On the rear side of each first cast structure 30, viewed in the direction of travel 14, a first profile 36, particularly an extruded profile in the form of a side member, is disposed.

Figure 4:
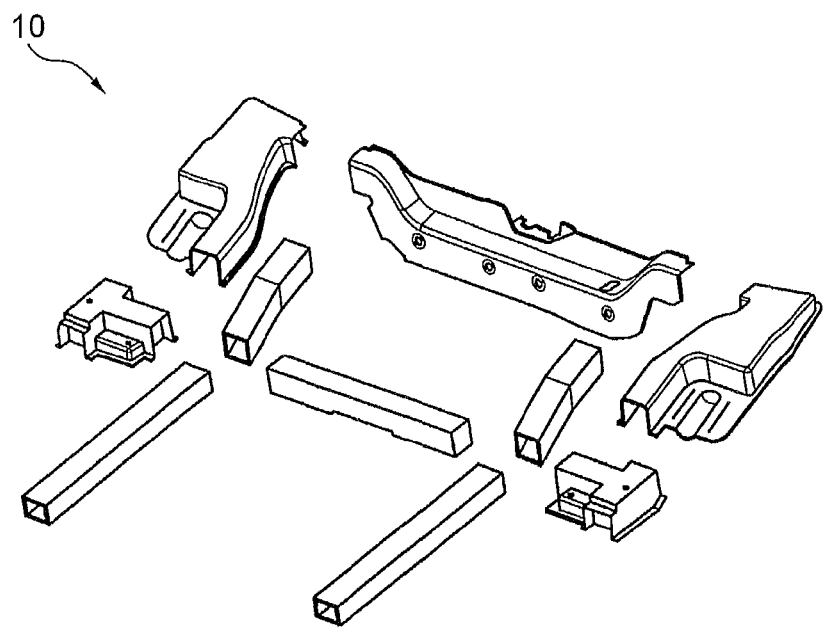

FIG. 4 shows an exploded representation of the components of a load-bearing frame to be disposed in the rear region of a motor vehicle, built up from a modular system 10 according to the invention in accordance with the exemplary embodiment in FIG. 3.

Figure 5:
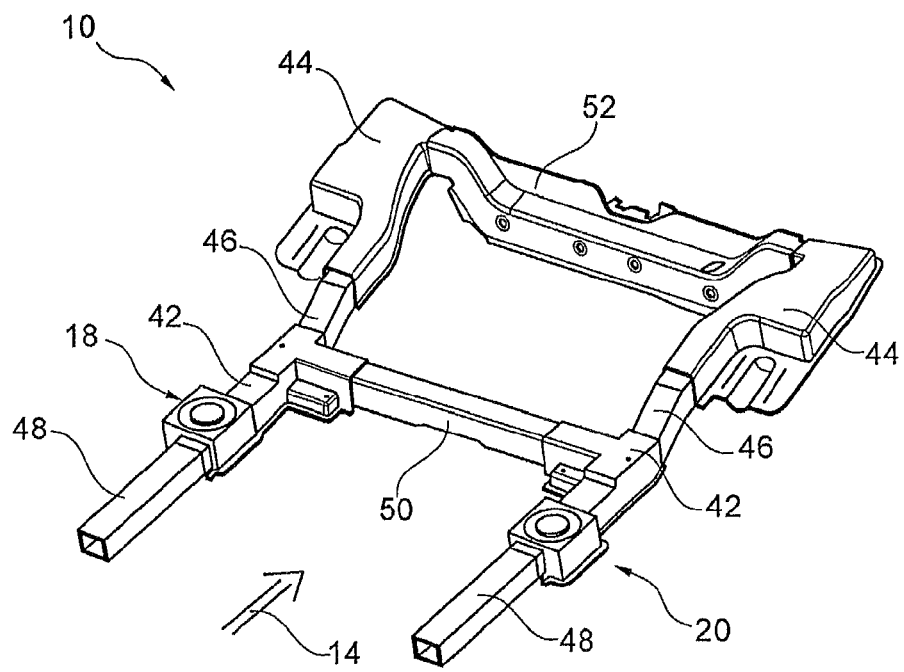

FIG. 5 shows a load-bearing frame to be disposed in the rear region of a motor vehicle, built up from components of a modular system 10 according to the invention. In the exemplary embodiment shown, the left side 18 and right side 20 of the frame, viewed in the direction of travel 14, are each formed from two cast structures 42, 44 and two profiles 46, 48, particularly extruded profiles in the form of side members. In this connection, a profile 46, particularly an extruded profile, is disposed between a first 42 and a second 44 cast structure of each frame side 18, 20, viewed in the direction of travel 14. Each cast structure 42, 44 comprises at least one node. The first cast structure 42 of the left 18 and the right 20 frame side, viewed in the direction of travel 14, are connected with one another by means of a first cross member 50, viewed in the direction of travel 14. The second cast structure 44 of the left 18 and the right 20 frame side, viewed in the direction of travel 14, are connected with one another by means of a second cross member 52, viewed in the direction of travel 14. The cross members 50, 52 are configured as profiles, particularly as extruded profiles. On the rear side of each first cast structure 42, viewed in the direction of travel 14, a first profile 48, particularly an extruded profile in the form of a side member, is disposed.

Figure 6:
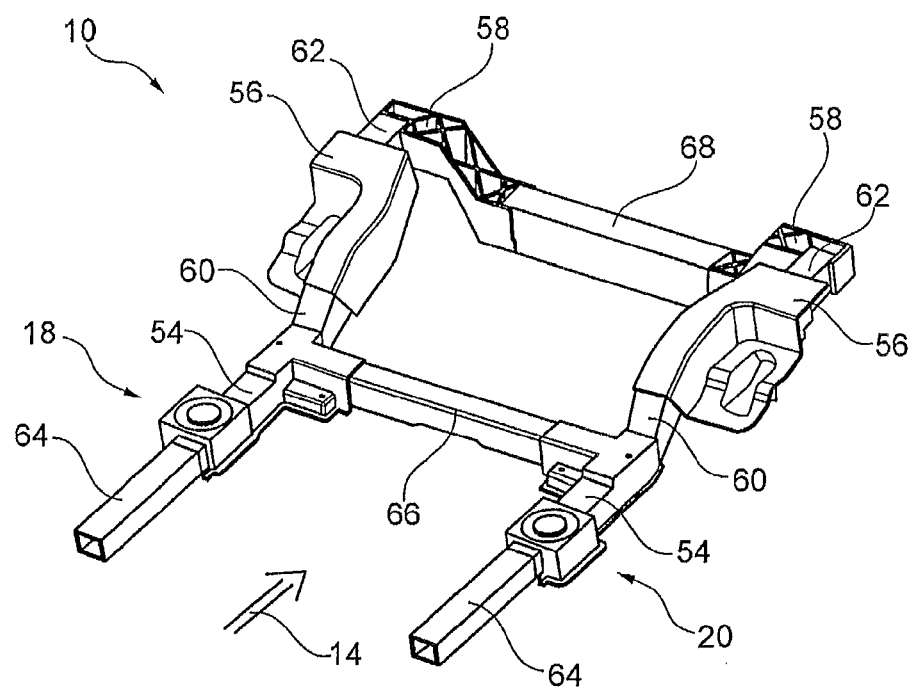

FIG. 6 shows a load-bearing frame to be disposed in the rear region of a motor vehicle, built up from components of a modular system 10 according to the invention. In the exemplary embodiment shown, the left side 18 and right side 20 of the frame, viewed in the direction of travel 14, are each formed from three cast structures 54, 56, 58 and three profiles 60, 62, 64, particularly extruded profiles in the form of side members. In this connection, a profile 60, 62, in each instance, particularly an extruded profile in the form of a side member, is disposed between a first 54 and a second 56 as well as the second 56 and a third 58 cast structure of each frame side 18, 20, viewed in the direction of travel 14. Each cast structure 54, 56, 58 comprises at least one node. The first cast structure 54 of the left 18 and the right 20 frame side, viewed in the direction of travel 14, are connected with one another by means of a first cross member 66, viewed in the direction of travel 14. The third cast structure 58 of the left 18 and the right 20 frame side, viewed in the direction of travel 14, are connected with one another by means of a second cross member 68, viewed in the direction Of travel 14. The cross members 66, 68 are configured as profiles, particularly as extruded profiles. On the rear side of each first cast structure 54, viewed in the direction of travel 14, a first profile 64, particularly an extruded profile in the form of a side member, is disposed.

Figure 7:
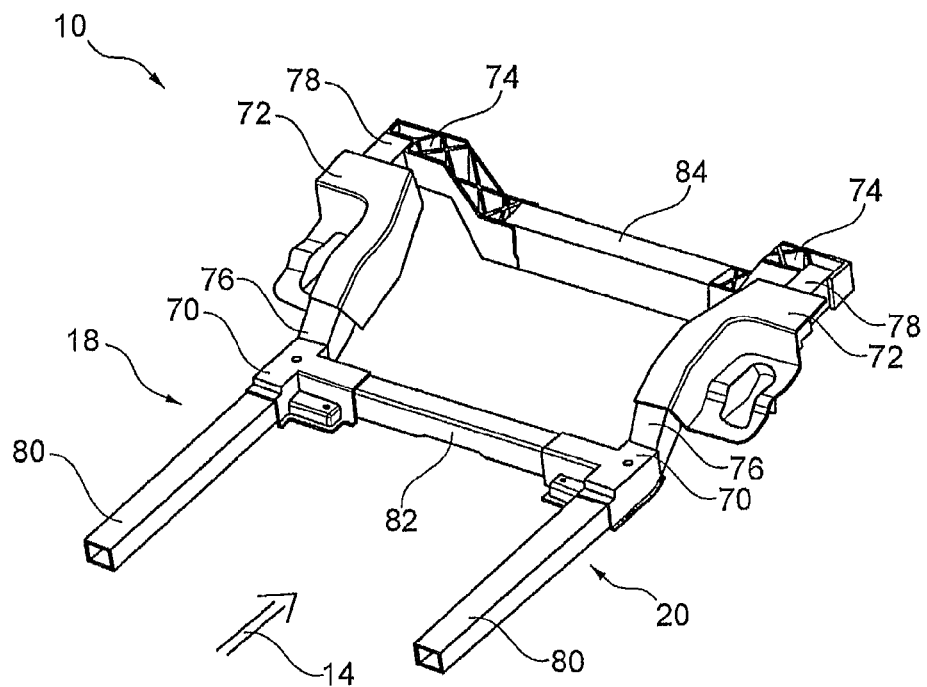

FIG. 7 shows a load-bearing frame to be disposed in the rear region of a motor vehicle, built up from components of a modular system 10 according to the invention. In the exemplary embodiment shown, the left side 18 and right side 20 of the frame, viewed in the direction of travel 14, are each formed from three cast structures 70, 72, 74 and three profiles 76, 78, 80, particularly extruded profiles in the form of side members. In this connection, a profile 76, 78, in each instance, particularly an extruded profile in the form of a side member, is disposed between a first 70 and a second 72 as well as the second 72 and a third 74 cast structure of each frame side 18, 20, viewed in the direction of travel 14. Each cast structure 70, 72, 74 comprises at least one node. The first cast structure 70 of the left 18 and the right 20 frame side, viewed in the direction of travel 14, are connected with one another by means of a first cross member 82, viewed in the direction of travel 14. The third cast structure 74 of the left 18 and the right 20 frame side 18, 20, viewed in the direction of travel 14, are connected with one another by means of a second cross member 84, viewed in the direction of travel 14. The cross members 82, 84 are configured as profiles, particularly as extruded profiles. On the rear side of each first cast structure 70, viewed in the direction of travel 14, a first profile 80, particularly an extruded profile in the form of a side member, is disposed.

Figure 8:
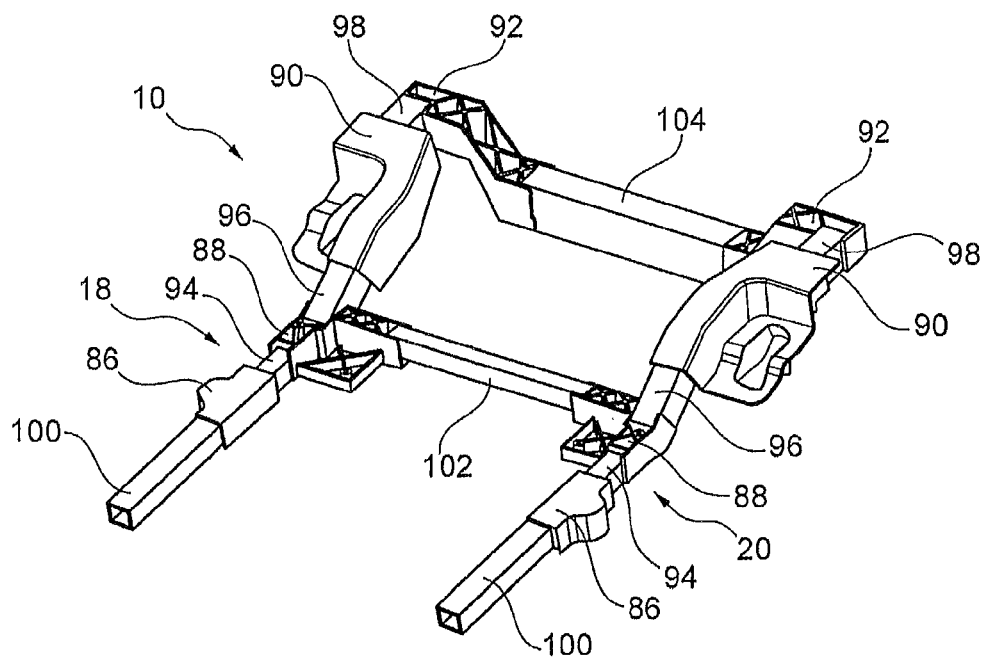

FIG. 8 shows a load-bearing frame to be disposed in the rear region of a motor vehicle, built up from components of a modular system 10 according to the invention. In the exemplary embodiment shown, the left side 18 and right side 20 of the frame, viewed in the direction of travel 14, are each formed from four cast structures 86, 88, 90, 92 and four profiles 94, 96, 98, 100, particularly extruded profiles in the form of side members. In this connection, a profile 94, 96, 98, in each instance, particularly an extruded profile in the form of a side member, is disposed between a first 86 and a second 88 as well as the second 88 and a third 90, as well as the third 90 and a fourth 92 cast structure of each frame side 18, 20, viewed in the direction of travel 14. Each cast structure 86, 88, 90, 92 comprises at least one node. The second cast structure 88 of the left 18 and the right 20 frame side, viewed in the direction of travel 14, are connected with one another by means of a first cross member 102, viewed in the direction of travel 14. The fourth cast structure 92 of the left 18 and the right 20 frame side, viewed in the direction of travel 14, are connected with one another by means of a second cross member 104, viewed in the direction of travel 14. The cross members 102, 104 are configured as profiles, particularly as extruded profiles. On the rear side of each first cast structure 86, viewed in the direction of travel 14, a first profile 100, particularly an extruded profile in the form of a side member, is disposed.

Figure 9:
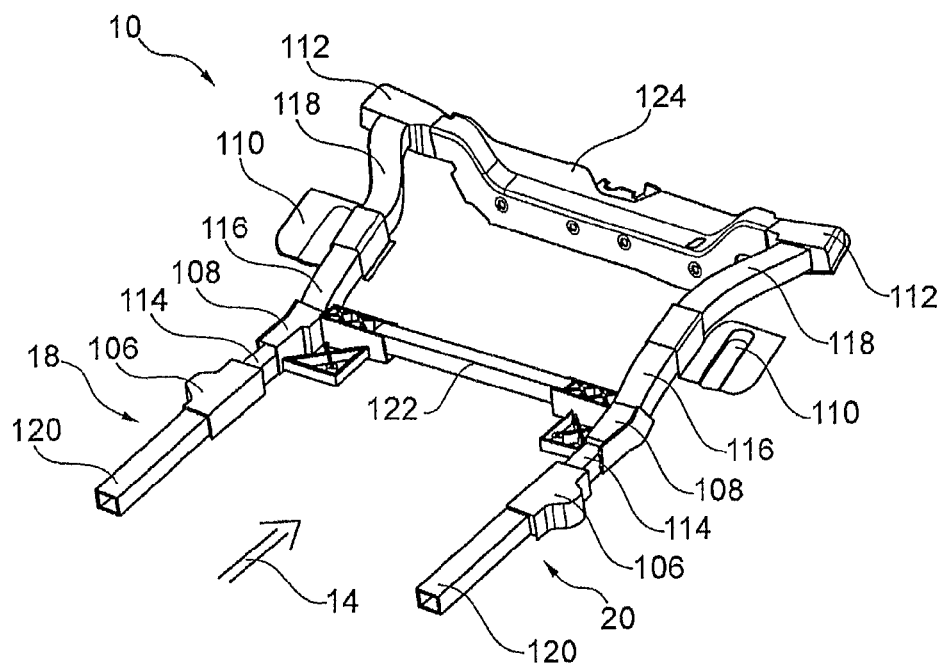

FIG. 9 shows a load-bearing frame to be disposed in the rear region of a motor vehicle, built up from components of a modular system 10 according to the invention. In the exemplary embodiment shown, the left side 18 and right side 20 of the frame, viewed in the direction of travel 14, are each formed from four cast structures 106, 108, 110, 112 and four profiles 114, 116, 118, 120, particularly extruded profiles in the form of side members. In this connection, a profile 114, 116, 118, in each instance, particularly an extruded profile in the form of a cross member, is disposed between a first 106 and a second 108 as well as the second 108 and a third 110 cast structure as well as the third 110 and a fourth 112 cast structure of each frame side 18, 20, viewed in the direction of travel 14. Each cast structure 106, 108, 110, 112 comprises at least one node.

The second cast structure 108 of the left 18 and the right 20 frame side, viewed in the direction of travel 14, are connected with one another by means of a first cross member 122, viewed in the direction of travel 14. The fourth cast structure 112 of the left 18 and the right 20 frame side, viewed in the direction of travel 14, are connected with one another by means of a second cross member 124, viewed in the direction of travel 14. The cross members 122, 124 are configured as profiles, particularly as extruded profiles. On the rear side of each first cast structure 106, viewed in the direction of travel 14, a first profile 120, particularly an extruded profile in the form of a side member, is disposed.

Figure 10:
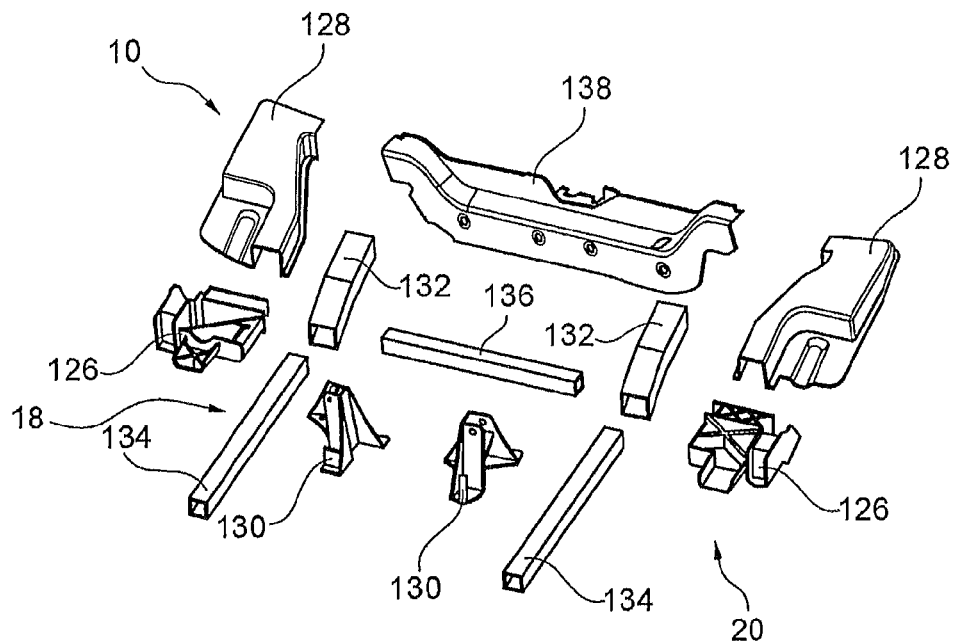

FIG. 10 shows a load-bearing frame to be disposed in the rear region of a motor vehicle, built up from components of a modular system 10 according to the invention, with partial integration of a chassis. In the exemplary embodiment shown, the left side 18 and right side 20 of the frame, viewed in the direction of travel 14, are each formed from three cast structures 126, 128, 130 and two profiles 132, 134, particularly extruded profiles in the form of side members. In this connection, a profile 132, particularly an extruded profile, is disposed between a first 126 and a second 128 cast structure of each frame side 18, 20, viewed in the direction of travel 14. The second 126 and third 128 cast structure, viewed in the direction of travel 14, each comprise at least one node. The second cast structure 126 of the left 18 and the right 20 frame side, viewed in the direction of travel 14, are connected with one another by means of a first cross member 136, viewed in the direction of travel 14. The third cast structure 128 of the left 18 and the right 20 frame side 18, 20, viewed in the direction of travel 14, are connected with one another by means of a second cross member 138, viewed in the direction of travel 14. The cross members 136, 138 are configured as profiles, particularly as extruded profiles. On the rear side of each first cast structure 126, viewed in the direction of travel 14, a first profile 134, particularly an extruded profile in the form of a side member, is disposed.

The first cast structure 130, viewed in the direction of travel 14, comprises components of a chassis and is affixed on the inside of the first profile 134, as well as in front of the second cast structure 126, viewed in the direction of travel 14.

Figure 11:
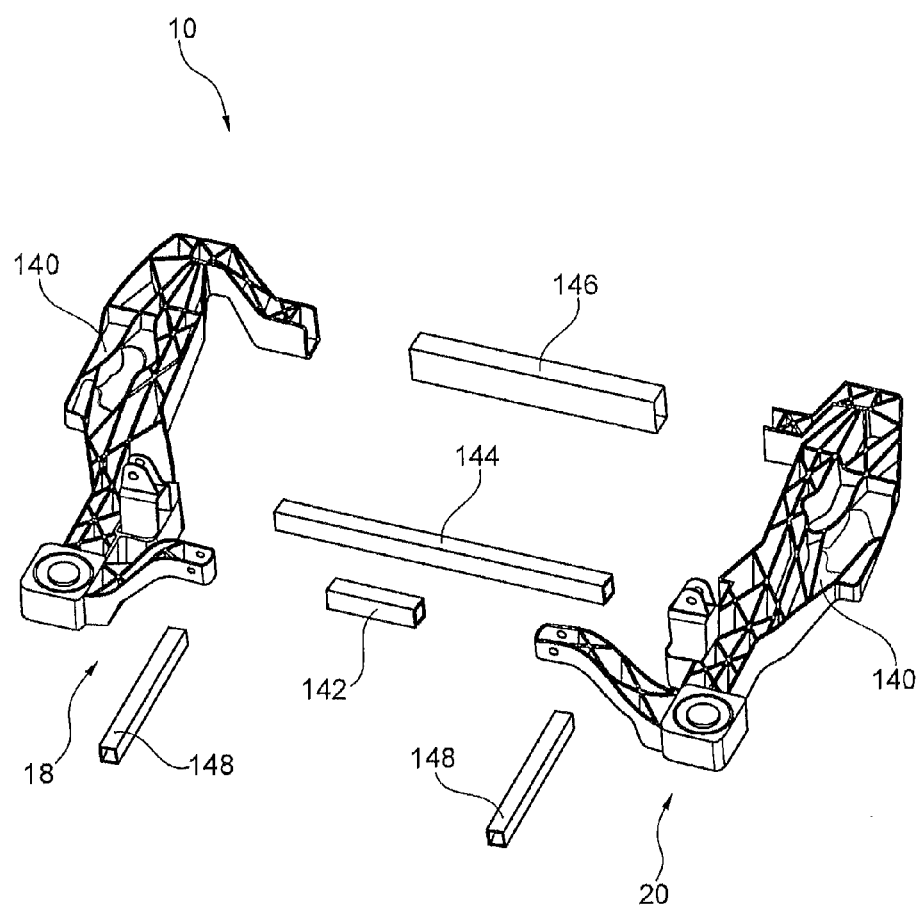

FIG. 11 shows a load-bearing frame to be disposed in the rear region of a motor vehicle, built up from components of a modular system 10 according to the invention with complete integration of a chassis. In the exemplary embodiment shown, the left side 18 and right side 20 of the frame, viewed in the direction of travel 14, are formed, for the most part, by a cast structure 140, in each instance, wherein the respective cast structure comprises all the nodes and all the components of a chassis on its frame side 18, 20. The cast structures 140 disposed on the left 18 and right 20 side, viewed in the direction of travel 14, are connected by way of a first 142, a second 144, and a third 146 cross member, viewed in the direction of travel 14. The cross members 142, 144, 146 are configured as profiles, particularly as extruded profiles. On the rear side of each cast structure 140, viewed in the direction of travel 14, a profile 148, particularly an extruded profile in the form of a side member, is disposed.

The invention claimed is:

1. Modular system as a load-bearing frame to be disposed in a rear region of a motor vehicle, the load-bearing frame consisting of components that are to be connected or are connected with one another in modular manner,
   wherein the components consist of two cast structures, two profiles, and at least one cross member,
   wherein the two cast structures and the two profiles are for forming a left frame side, viewed in a direction of travel, and for forming a right frame side, viewed in the direction of travel,
   wherein the at least one cross member connects the two cast structures with each other,
   wherein a first cast structure of the two cast structures comprises all nodes of the left frame side and a second cast structure of the two cast structures comprises all nodes of the right frame side,
   wherein a first profile of the two profiles and a second profile of the two profiles are each configured as a longitudinal support,
   wherein the first profile is disposed at a rear side of the first cast structure, viewed in the direction of travel, and forms the other part of the left frame side, and
   wherein the second profile is disposed at a rear side of the second cast structure, viewed in the direction of travel, and forms the other part of the right frame side.

2. Modular system according to claim 1, wherein the first profile is configured as an extruded profile.

3. Modular system according to claim 1, wherein at least one of the two cast structures and/or at least one of the first and second profiles comprises at least one component of a chassis.

4. Modular system according to claim 1, wherein at least one of the two cast structures and/or at least one of the first and second profiles comprises all the components of a chassis.

5. Modular system according to claim 1, wherein at least one of the two cast structures comprises light metal.

6. Modular system according to claim 1, wherein at least one of the first and second profiles is a cast profile.

7. Modular system according to claim 1, wherein at least one of the first and second profiles comprises light metal.

8. Modular system according to claim 1,
   wherein at least one of the first cast structure and the second cast structure comprises a seat for connecting, mounting, or attaching a chassis component.

* * * * *